Figure 1:
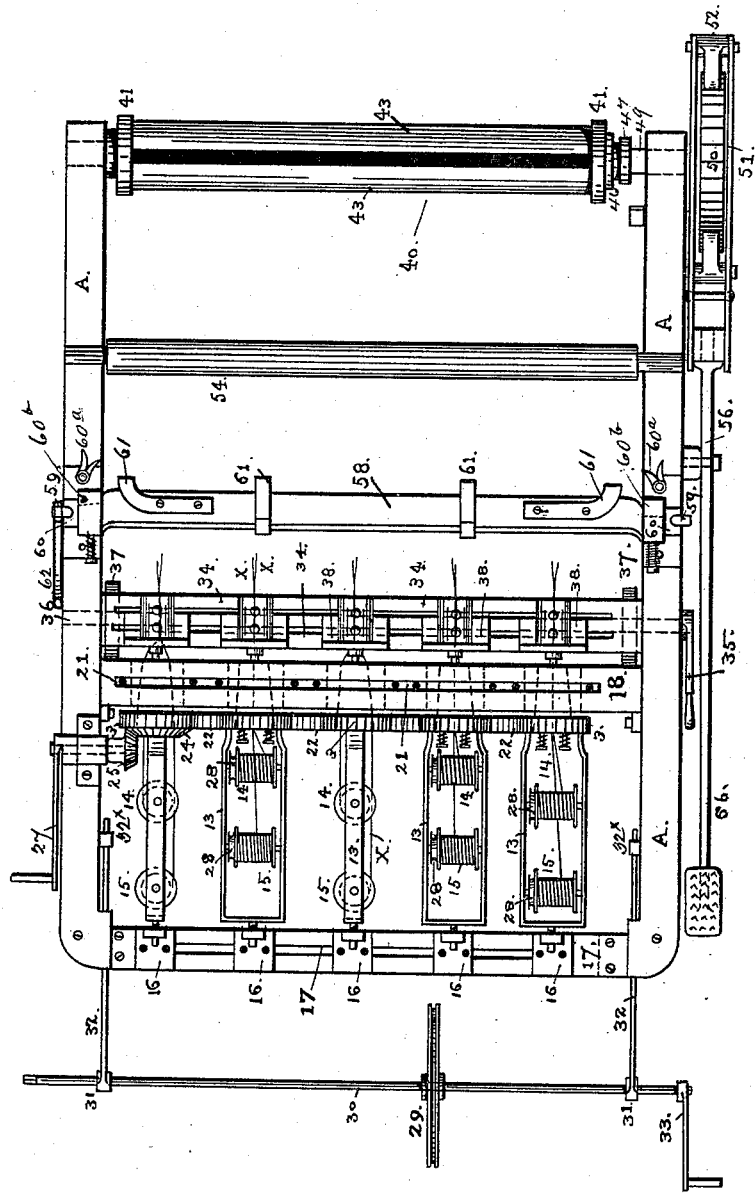

(No Model.) 3 Sheets—Sheet 1.

H. T. RENTON.
MACHINE FOR MAKING SLAT AND WIRE FENCING.

No. 417,504. Patented Dec. 17, 1889.

WITNESSES.
INVENTOR.

(No Model.) 3 Sheets—Sheet 2.
H. T. RENTON.
MACHINE FOR MAKING SLAT AND WIRE FENCING.
No. 417,504. Patented Dec. 17, 1889.
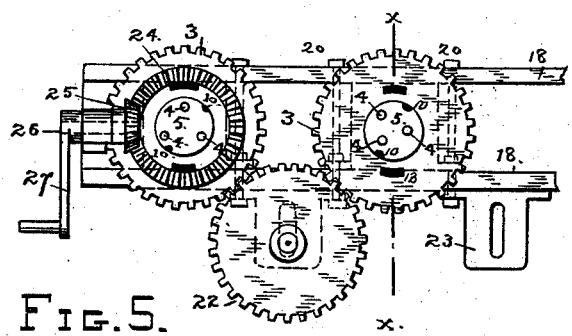
FIG. 5.
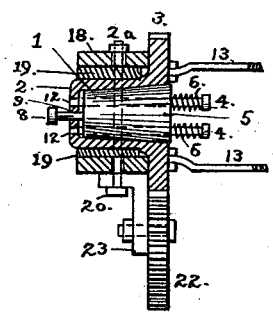
FIG. 6.
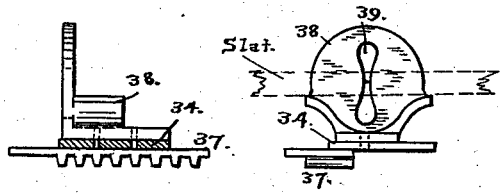
FIG. 7. FIG. 8. FIG. 9.
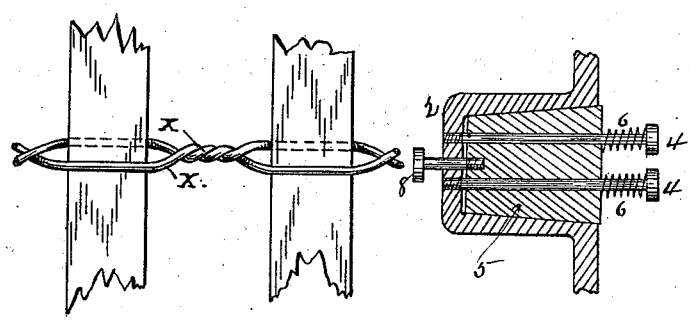
FIG. 10.
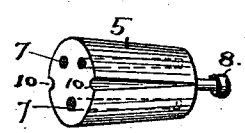
Fig. 6ᴬ.
WITNESSES.
J. E. Jacobus.
R. H. Peat.
INVENTOR.
Henry Thomas Renton
By Smith & Osborn
Attorneys.

(No Model.) 3 Sheets—Sheet 3.
H. T. RENTON.
MACHINE FOR MAKING SLAT AND WIRE FENCING.
No. 417,504. Patented Dec. 17, 1889.
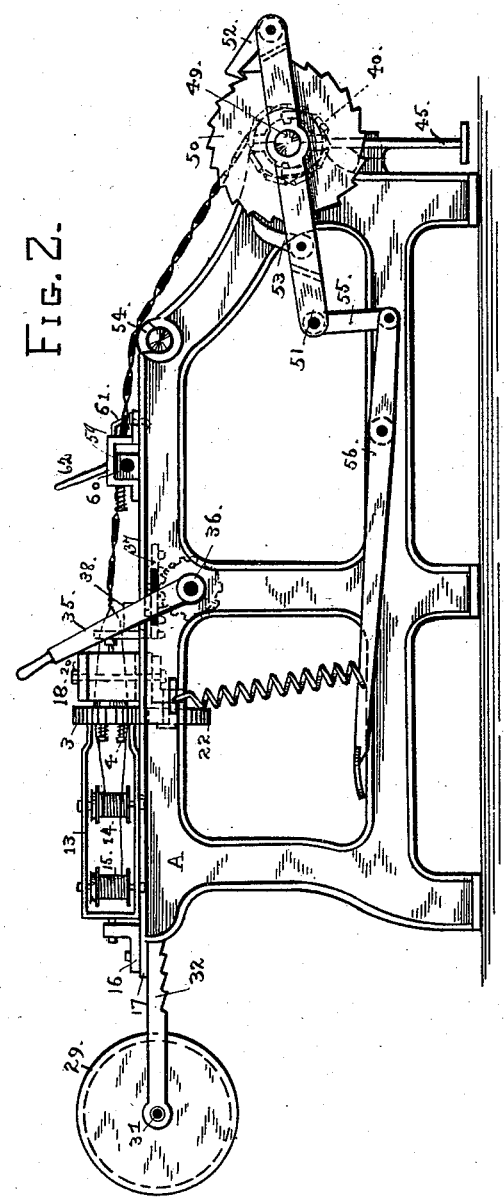
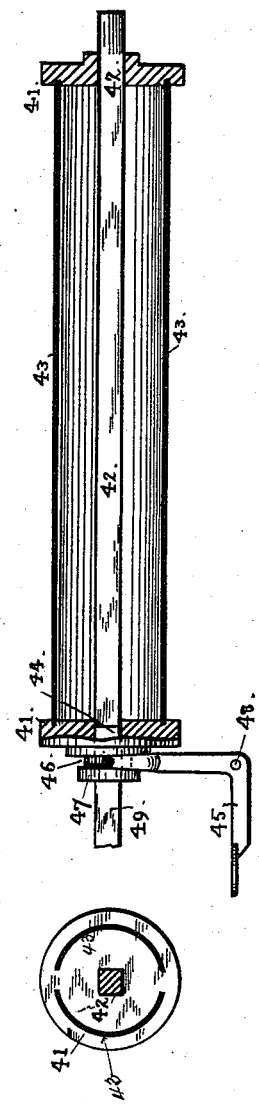
Witnesses.
J. E. Jacobus.
R. H. Peat.
Inventor.
Henry Thomas Renton
By Smith & Osborn,
Attorneys

UNITED STATES PATENT OFFICE.

HENRY THOMAS RENTON, OF OAKLAND, CALIFORNIA.

MACHINE FOR MAKING SLAT-AND-WIRE FENCING.

SPECIFICATION forming part of Letters Patent No. 417,504, dated December 17, 1889.

Application filed October 14, 1887. Serial No. 252,399. (No model.)

*To all whom it may concern:*

Be it known that I, HENRY THOMAS RENTON, a citizen of the United States, residing in the city of Oakland, county of Alameda, and State of California, have invented certain new and useful Improvements in Machines for Making Slat-and-Wire Fencing; and I do hereby declare that the following is a full, clear, and exact description of my said invention, reference being had to the accompanying drawings, which form a part of this specification.

My invention relates to machinery for twisting or weaving slat-and-wire fencing; and it consists in certain improvements in twisting mechanism and in the construction and combination of other parts, as hereinafter fully described and claimed, producing a simple and rapidly-operating machine.

The nature of these improvements and the manner in which I have constructed and combined the same to produce a machine capable of being worked by one or two persons are explained in the following description, the accompanying drawings being referred to by figures and letters.

Figure 1 is a top view of the machine. Fig. 2 is an elevation taken from the lower side of Fig. 1. Figs. 3 and 4 are views in longitudinal and transverse section through the drum or roller at the front end of the machine, on which the finished fencing is wound up into rolls of suitable size. Fig. 5 is a front view of two twisters and connecting-gears. Fig. 6 is a vertical section through one of the twisters, taken at about the line $x \, x$, Fig. 5. Fig. 6ª is a view showing some of the parts shown in Fig. 6 on a larger scale, and with the plug in section to show the connection between the pins and the hub. Figs. 7 and 8 are detail views of parts of the slide-bar that acts on the twister-plugs, and Fig. 9 is a perspective view of one of these plugs removed from the socket in the twister-gear. Fig. 10 is a section of the finished fencing, showing the twisted binding-wires and a portion of two slats.

My said improvements in the twisting mechanism of these machines consist in a twisting-gear with a deep cup-shaped socket in the hub opening toward the rear, or that side from which the wires are drawn from the spools, and in a plug of corresponding shape that fills the hub and, when forced down into place, clamps the wires lying between it and the inner walls of the hub. The front end of the hub is provided with apertures for the wires, and in the center also an opening for a push-pin that is fixed in the end of the plug and projects in front of the hub through this aperture. Strong spiral springs are placed behind the hub to bear upon the head of the plug with a pressure sufficient to maintain a firm grip upon the wires, and by their action, as well as by the tapering form of the plug and socket, the two wires are held during the twisting operation. The power of these springs is overcome and the plug pressed back to release the wires after each twist and to permit the wires to be drawn through the hub for the next twist and space the slats by applying against the end of the push-pin a force sufficient to overcome the springs and hold back the plug.

The socket 1 is formed in the hub 2 of the gear 3, as shown in Figs. 5 and 6, and three guide-pins 4 4 4 are fixed in the end of the hub to extend through the socket and out beyond the head of the plug 5 when it is set into the socket. On these pins are placed the spiral springs 6 6 to bear against the head of the plug, each pin having a head on the end to hold the spring. The plug is pierced with holes 7 for the pins, and the push-pin 8 in the front end sets through the aperture 9 in the bottom of the socket. The grooves or passages 10 along the sides of the plug are arranged to hold the wires X in line on opposite sides of the center or axis of revolution to produce uniform twist, and in line with them are the apertures 12 in the front end of the hub where the wires pass out.

To the back of the twisting-gear is fixed the front end of the spool-carrying frame 13, in which are mounted two spools 14 and 15, the rear end of the frame being supported by a stud journaled in a box 16 on a cross-bar 17 at the end of the machine-frame. Parallel with this rear cross-bar at a point in front of it is secured between the side frames A A of the machine a cross-bar 18, formed of two slotted beams set one above the other to take the boxes 19 for the hubs of the twisting-gears. These are fixed by bolts 20, passing through slots 21 in both beams, one bolt on each side of a box, and by loosening these fastenings the position of the gears can be changed to bring them closer to or farther away from one another, or to remove one or more boxes and gears, or to insert additional ones.

In the present machine herein described I have arranged five twisting-gears at uniform distance apart to twist as many rows of wires; but this number can be varied, and the distance between one row and another can be increased or diminished by taking out or adding twisters and gears and spacing them as required. Provision is made for this both at the front boxes 9 and at the rear boxes 16 by having the bolts 20 taking through slots, as shown in Fig. 1.

The gears are connected in continuous series 3 by gears 22, set in adjustable hangers 23, depending from the bottom side of the bar 18, and the first or head twisting-gear is connected by a miter-gear 24 on its face with the pinion 25 on a shaft 26, having a hand-crank 27 for turning it. By means of this crank power is applied to the entire number of twisters at once. The gears 22 are adjustable vertically as well as laterally along the bar 18, as the hangers are slotted. They can also be shifted along the bar by loosening the bolts.

It will be noticed that the spools 14 and 15 are set in alternate order in the spool-frames to bring the spools of one frame opposite to the spaces between the spools in the next frame. This is done to allow the frames to run without interfering when the twisters are set up closer together. Each spool is provided with a small sheave 28, to take a belt from a sheave 29 of a winding attachment that is seen at the rear end of the machine in Figs. 1 and 2. The object of this device is to enable the spools to be refilled without taking them out of the frames. It is formed of a square shaft 30, mounted in bearings 31 at the ends of notched sliding bars 32, and having a crank 33 on one end for turning it. The sheave 29 on this shaft is capable of longitudinal movement, so that it can be shifted on the shaft from one spool-frame to another. The sheave can be set toward or away from the spool-frame, also, by pushing in or drawing out the side bars that carry the shaft, and thus the same length of belt can be used to wind both spools in the frame. When the front spool is filled, the belt can be placed on the sheave of the rear spool, and the winding-shaft will then be set back, as shown in Fig. 1, to bring the belt taut, the notched bar 32 engaging with a stop $32^\times$ on the frame.

At the front of the twisters, between the side frames A A, is mounted a sliding bar 34, that is movable toward and away from the front of the hubs, the movement being effected by a hand-crank 35 on the end of a rock-shaft 36 and a toothed segment or a gear on the same shaft on each end engaging with a short rack 37 at each end of the slide on the bottom. Standing lugs or angle-irons 38 are secured to the bar at intervals apart, one in line with each hub, and the bolts that fasten them are set through slots in the bar, so that when the twisters are shifted these parts 38 can be moved and set accordingly. The top faces of these standing parts form a rest for the slat when it is introduced between the wires, while the front faces, standing in line with the heads of the push-pins 8, act to press the pins back and throw the plugs outward at the rear as often as the bar 34 is pressed back. Thus by throwing sufficient power upon the hand-crank 35 all the plugs of the twisters will be forced back and the wires released at the same time. The wires pass out at the front of the twisters, and thence through the long slot 39 in the standing part 38, one wire lying at the bottom and the other at the top of the slot directly over the bottom wire after each twisting operation, when the next slat is to be inserted.

After one twist is made and before the twisters operate again the wires have to be drawn through the hubs from the spools a suitable length in order to furnish sufficient wire for the next twist and to let in the slat as well. This is done between the twists by simply winding up the finished fencing upon a reeling drum or roller 40 at the front of the machine. The fencing is carried downward to this drum over the roller 54, and at the beginning of operations the ends of the wires are connected to the drum by cords or lengths of wire from the first slat, so that by winding these up the fencing will be drawn forward and finally taken upon the drum. When a roll or bundle of suitable size is formed in this manner, it is taken out of the machine by drawing the heads of the drum apart and allowing the core or center to drop clear of the heads. Figs. 1, 3, and 4 show the construction of drum employed by me for this purpose. The heads 41 are grooved on the inner face to take the ends of two half-cylinder lengths of pipe or tube 43, and the shaft 42 has one head fixed on it near one end, but slips into a square socket 44 in the center of the opposite head, the shaft being square. The two heads are set up toward each other, after the center 43 is placed in position, by means of a foot-lever 45, having a forked end taking a groove 46 in the hub 47 on the outer face of the head and pivoted at 48 to the machine-frame. This head slides on a short shaft 49, that runs through a box in the frame to the outside and carries a ratchet-wheel 50. A lever 51, carrying two pawls 52 53 and working on the outside of the ratchet-wheel and on the same shaft as a pivot, is connected by a link 55 with a foot-lever 56. The workman who handles the lever 35 to press in the plugs and release the wires can move the winding-drum, and by taking up the finished fencing thereby draw off from the spools, while still holding back the presser-bar, sufficient wire to let in the next slat and form the next twist. For this purpose I have placed the hand-lever and this foot-lever on the same side of the machine. The length of wire drawn off in this manner from the spools after one twist and before the next is controlled and determined by a pivoted bar or plate 58, having pintles 59 on the ends, set into yielding boxes 60 on the tops of the side frames, and carrying fingers 61, with ends bent down, as shown in Fig. 2. This bar is set in front of the bar on which the slats are laid, and is sufficiently elevated, also, to let the slats pass under it on the way to the drum; but the bent ends of the fingers are set to catch the front edge of a slat when the bar is not raised. Now, by turning up this bar, which is done by means of a hand-lever 62 at one end, the fingers 61 will be raised clear of the slats, and the drum can be turned without stretching or breaking the fencing; but when the stop-bar is dropped the fingers will catch behind the slat that comes under them and will check the winding. In operating this stop-bar the workman raises it as he begins to turn the drum, and after the edge of the slat has cleared the fingers the bar is dropped, so that the ends of the fingers will ride on the top face of the slat. In this position the bar will not check the movement of the fencing until the fingers, having dropped off the slat and passed through the space between it and the slat next behind, shall catch the front edge of the next slat. When this point is reached, it will be seen that the fingers will stop further movement, and this determines the length of wires required for the next slat and the twist.

The boxes 60, that carry the stop-bar, are capable of yielding, as before mentioned, in order to prevent a sudden check or stop in the fencing being wound up on the roller. This yielding effect is produced by fastening to the bearing-block 60 one or more headed pins $60^x$, which are provided with springs $60^{xx}$, which bear at one end under the head of the pin and at the other against a fixed portion of the frame. The boxes 60 are held in guides $60^b$, which are bolted to the frame by bolts, which may have butterfly-nuts, as shown at $60^a$, for convenience of removal.

By locating the three levers on the same side of the machine all these operations can be performed by one workman, while another workman turns the twisters and feeds in the slats.

Having thus fully described my invention, what I claim, and desire to secure by Letters Patent, is—

1. The combination of a series of twisters, a series of spool-frames located in the rear of said twisters, and a series of clamps arranged to clamp the wire between the spool-frames and twisters while it is being twisted.

2. The combination of a series of twisters having conical openings in their rear ends, a series of sliding cone-shaped clamping-blocks in said openings, a spring arranged to hold said blocks in engagement with the twisters, and mechanism for moving said blocks out of engagement with the twisters.

3. The combination of rotating spindles, spools for carrying the wire, twister-heads and tension-clutches through which the wires pass carried by said spindles, and a sliding cross-head for forcing and holding the slat against the previous twist while the wires are twisting and for releasing the clutch, said cross-head having a rack-base whereby it is reciprocated.

4. The combination of rotating spindles, spools with wire carried thereby, twister-heads and tension-clutches through which the wires pass carried by the spindles, a sliding cross-head forcing and holding the slat against the previous twist and for operating the tension-clutch to release the wires, and a reel by which the wires are drawn forward and upon which the completed fence is wound.

5. In a slat-and-wire-fence machine, a twister consisting of a gear-wheel with a spool-carrying frame on its rear face and a hub with a tapering socket having apertures through the front end for drawing the wires through, in combination with a tapering plug fitting said socket and adapted to grip and hold the wires, and having a push-pin projecting from the front end through the end of the hub, and springs applied to the back end or head of the plug, substantially as described, for operation as set forth.

6. The combination, with the twister-gear 3, having a hub with a tapering socket provided with wire-apertures 12 12, and the guide-pins 4, of the plug 5, push-pin 8 at one end of the plug, working through the end of the socket, and the spring 6, applied to the back end or head of the plug, as described.

7. The combination, with twister-gears having sockets fitted with gripping-plugs 5, and push-pins 8, projecting through the sockets to the front, of the presser-bar 34, having standing projections or faces 38 in line with the push-pins, and means, substantially as described, for moving said presser-bar against the push-pins to press back the plugs, and springs behind the plugs to throw them forward, for operation as set forth.

8. In a slat-and-wire-fence machine, the combination, with the wire-carrying spools mounted in a revolving frame, a pulley on each spool, notched arms 32, extending out from the end of the frame and adjustable therein, shaft 30, carried by said arms, a crank upon said shaft, and a longitudinally-movable sheave 29 upon said shaft, and means, substantially as described, for connecting said sheave with the pulley upon any one of said spools, as set forth.

9. The combination of the frame A A, having slotted cross-bars 17 18, the adjustable boxes 16 and 19, twister-gears having spool-carrying frames 13 secured to or carried by them and having sockets with yielding plugs 5, and push-pins 8, projecting in front of the sockets, and the presser bars 34 38, capable of movement toward and back from the push-pins, and means, substantially as described, for moving said presser-bar.

10. The combination, with the twister-gears laterally adjustable in the machine-frame, as described, and having yielding plugs with push-pins projecting to the front, of the slotted presser-bar 34, having standing lugs or angle-pieces 38, which are capable of lateral adjustment on said presser-bar and have slots or openings 39 for the wires, as described.

11. In a slat-and-wire-fence machine, the combination, in a suitable frame, of revolving twisters 3, carrying spool-frames 13, and having apertures or passages through the hubs of the twister-gears and wire-gripping devices in said hubs, the reel or winding-drum 40, and mechanism, substantially as described, for turning said drum, and the stop-bar 58, with catches 61, for operation as set forth.

12. The combination, with wire-twisting devices in a slat-and-wire-fence machine at one end of the machine-frame and a reel or winding-up drum at the other end, of the yielding stop-bar 58, having fingers 61, and located between said twisters and drum, for operation as set forth.

13. In a slat-and-wire-fence machine, a winding-up drum having separable ends or heads and a center or spool consisting of a square shaft 42 and two semi-cylindrical pieces 43, which is capable of being dropped out from between the heads to remove the roll of fencing, as described.

14. The combination of the short shaft 49, the head 41, capable of longitudinal movement thereon, with grooved hub 46 for a foot-lever 45, the slip-shaft 42, carrying the opposite head 41, and the removable center spool or core 43.

In testimony that I claim the foregoing I have hereunto set my hand and seal.

HENRY THOMAS RENTON. [L. S.]

Witnesses:
C. W. M. SMITH,
CHAS. E. KELLY.